(12) United States Patent
Atar

(10) Patent No.: US 11,027,342 B2
(45) Date of Patent: Jun. 8, 2021

(54) DOUBLE-SIDED CUTTING INSERT HAVING DIAGONALLY OPPOSED RAISED CORNERS AND DIAGONALLY OPPOSED LOWERED CORNERS, AND ROTARY CUTTING TOOL

(71) Applicant: Iscar, Ltd., Tefen (IL)

(72) Inventor: Osama Atar, Yarka (IL)

(73) Assignee: Iscar, Ltd., Tefen (IL)

( * ) Notice: Subject to any disclaimer, the term of this patent is extended or adjusted under 35 U.S.C. 154(b) by 42 days.

(21) Appl. No.: 16/366,088

(22) Filed: Mar. 27, 2019

(65) Prior Publication Data

US 2020/0306844 A1  Oct. 1, 2020

(51) Int. Cl.
*B23C 5/20* (2006.01)

(52) U.S. Cl.
CPC ...... *B23C 5/207* (2013.01); *B23C 2200/0433* (2013.01)

(58) Field of Classification Search
CPC ... B23C 5/202; B23C 5/207; B23C 2200/201; B23C 2200/367
See application file for complete search history.

(56) References Cited

U.S. PATENT DOCUMENTS

| | | | |
|---|---|---|---|
| 5,486,073 | A | 1/1996 | Satran et al. |
| 6,921,233 | B2 | 7/2005 | Duerr et al. |
| 7,073,987 | B2 | 7/2006 | Hecht |
| 7,094,007 | B2 | 8/2006 | Satran et al. |
| 7,104,736 | B2 | 9/2006 | Satran et al. |
| 7,241,082 | B2 | 7/2007 | Smilovici et al. |
| 7,246,973 | B2 | 7/2007 | Johnson et al. |
| 7,560,068 | B2 | 7/2009 | Smilovici et al. |
| 8,449,230 | B2 | 5/2013 | Nguyen et al. |
| 8,753,045 | B2 | 6/2014 | Hecht |
| 8,876,440 | B2 | 11/2014 | Nam et al. |
| 9,168,590 | B2 | 10/2015 | Kaufmann et al. |
| 9,186,732 | B2 | 11/2015 | Michelet et al. |

(Continued)

FOREIGN PATENT DOCUMENTS

| | | |
|---|---|---|
| JP | 5779830 B2 | 9/2015 |
| KR | 100958403 B1 | 5/2010 |
| WO | WO 2016/147493 | 9/2016 |

OTHER PUBLICATIONS

International Search Report dated Jun. 17, 2020, issued in PCT counterpart application (No. PCT/IL2020/050224).

(Continued)

*Primary Examiner* — Alan Snyder
(74) *Attorney, Agent, or Firm* — Womble Bond Dickinson (US) LLP

(57) ABSTRACT

A cutting insert has two opposing end surfaces interconnected by a peripheral side surface, the peripheral side surface having two major side surfaces and two minor side surfaces. Major edges are formed at the intersection of the major side surfaces and the end surfaces. Each end surface has two diagonally opposed raised corners and two diagonally opposed lowered corners with respect to a median plane, each raised corner adjoining one of the major edges at a first major point and each lowered corner adjoining one of the major edges at a third major point. In a major side view, each major edge has an associated first imaginary straight line containing its first and third major points, and an elevated edge portion located on one side of the first imaginary straight line. The cutting insert is removably secured in a rotary cutting tool.

25 Claims, 7 Drawing Sheets

(56) References Cited

U.S. PATENT DOCUMENTS

| | | |
|---|---|---|
| 9,649,701 B2 | 5/2017 | Horiike et al. |
| 10,112,242 B1 | 10/2018 | Hecht |
| 2001/0022123 A1 | 9/2001 | Schiffers |
| 2005/0063792 A1 | 3/2005 | Satran |
| 2007/0104546 A1 | 5/2007 | Maeta et al. |
| 2011/0129309 A1 | 6/2011 | Kovac et al. |
| 2012/0009029 A1 | 1/2012 | Saji |
| 2012/0039678 A1 | 2/2012 | Nguyen et al. |
| 2015/0231711 A1 | 8/2015 | Matsubara et al. |
| 2016/0023285 A1 | 1/2016 | Saji |

OTHER PUBLICATIONS

Written Opinion dated Jun. 17, 2020, issued in PCT counterpart application (No. PCT/IL2020/050224).

DOUBLE-SIDED CUTTING INSERT HAVING DIAGONALLY OPPOSED RAISED CORNERS AND DIAGONALLY OPPOSED LOWERED CORNERS, AND ROTARY CUTTING TOOL

FIELD OF THE INVENTION

The present invention relates to a rotary cutting tool and a double-sided cutting insert having diagonally opposed raised corners and diagonally opposed lowered corners. The cutting tool and cutting insert are for use in milling operations in general, and for ramping operations in particular.

BACKGROUND OF THE INVENTION

Within the field of cutting tools used in milling operations, there are some examples of double-sided cutting inserts having diagonally opposed raised corners and diagonally opposed lowered corners, used for performing ramping operations.

U.S. Pat. No. 8,449,230 discloses a tangential cutting insert including two opposing end surfaces and a peripheral side surface extending between the two opposing end surfaces. The peripheral side surface includes two opposing major side surfaces connected to two opposing minor side surfaces via corner side surfaces. A peripheral edge is formed at the intersection of each end surface with the peripheral side surface. Each end surface has two raised corners with associated raised corner cutting edges and two lowered corners with associated lowered corner cutting edges. Each of the corner side surfaces includes a concave clearance depression which serves as a relief surface for an associated lowered corner cutting edge. The concave clearance depression extends from its associated lowered corner cutting edge in the direction of, but does not intersect, a raised corner associated with opposite end surface.

U.S. Pat. No. 9,649,701 discloses a cutting insert and an indexable insert-type cutting tool including a cutting edge formed on each of a pair of side ridge portions of at least one of the side faces, wherein an insert main body is formed in the shape of having front-back inversion symmetry which is 180 degrees rotationally symmetrical with respect to a line of symmetry passing through the center of the side faces; a flank face adjacent to the cutting edge is formed on the side face in the vicinity of each of the pair of polygonal faces; each of the flank faces is formed in the shape of a twisted face; the pair of side ridge portions on which the cutting edge is formed intersect each other in such a manner that the second corner portion of one side ridge portion protrudes outside the other side ridge portion.

U.S. Pat. No. 10,112,242 discloses a double-sided, indexable, non-positive ramping insert having 180-degree rotational symmetry about each of the first, second and third axes of a three-dimensional Euclidean space. The ramping insert includes two first surfaces and an insert peripheral surface which extends therebetween. The ramping insert includes four cutting portions, each including a major cutting edge, a wiper edge connected transversely thereto via a corner cutting edge and a ramping edge which extends transversely from the wiper edge in a view parallel to the first axis. Each peripheral surface includes four non-positive ramping relief surfaces, each of which extends from a respective ramping edge towards, and not beyond, a first median plane which is defined by the second and third axes.

SUMMARY OF THE INVENTION

In accordance with the present invention, there is provided a cutting insert comprising:

two opposing end surfaces interconnected by a peripheral side surface and an insert axis passing through the opposing end surfaces, each end surface having a recessed central surface, the peripheral side surface having two opposing major side surfaces and two minor side surfaces, a major edge formed at the intersection of each major side surface and each end surface, and a major cutting edge formed along at least a portion of each major edge, a minor edge formed at the intersection of each minor side surface and each end surface, and a minor cutting edge formed along at least a portion of each minor edge, a median plane perpendicular to the first insert axis and intersecting the peripheral side surface to form an insert boundary line, and each end surface having two diagonally opposed raised corners and two diagonally opposed lowered corners with respect to the median plane, each raised corner having a convexly curved raised corner edge formed at the intersection of the peripheral side surface and its associated end surface, each raised corner edge adjoining one of the major edges at a first major point, and a raised corner cutting edge formed along at least a portion of each raised corner edge, each lowered corner having a convexly curved lowered corner edge formed at the intersection of the peripheral side surface and its associated end surface, each lowered corner edge adjoining one of the major edges at a third major point, and a lowered corner cutting edge formed along at least a portion of each lowered corner edge, wherein in a major side view of the cutting insert:

the first and third major points of each major edge define a major side length measured parallel to the median plane, the major side length being divided into equal first, second and third length portions, in which the first length portion is delimited by the first major point and the third length portion is delimited by the third major point, each major edge has an associated first imaginary straight line containing its first and third major points and an elevated edge portion, the elevated edge portion being located on one side of the first imaginary straight line and the insert boundary line being located on the other side of the first imaginary straight line, and each elevated edge portion has a second major point located: (i) furthest from its associated first imaginary straight line, and (ii) in the third length portion of its associated major side length.

Also, in accordance with the present invention, there is provided a rotary cutting tool rotatable about a tool axis in a direction of rotation, comprising a cutting body having at least one insert receiving pocket, and at least one cutting insert of the sort described above removably secured in the insert receiving pocket.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

As shown in FIGS. 1 to 4, one aspect of the present invention relates to a cutting insert 20 having two opposing end surfaces 22a, 22b interconnected by a peripheral side surface 24 and a first insert axis A1 passing through the opposing end surfaces 22a, 22b.

In some embodiments of the present invention the cutting insert 20 may be indexable about the first insert axis A1.

Also, in some embodiments of the present invention, the cutting insert 20 may exhibit rotational symmetry about the first insert axis A1.

Further, in some embodiments of the present invention, the cutting insert 20 may preferably be manufactured by form pressing and sintering a cemented carbide, such as tungsten carbide, and may be coated or uncoated.

Figure 1:
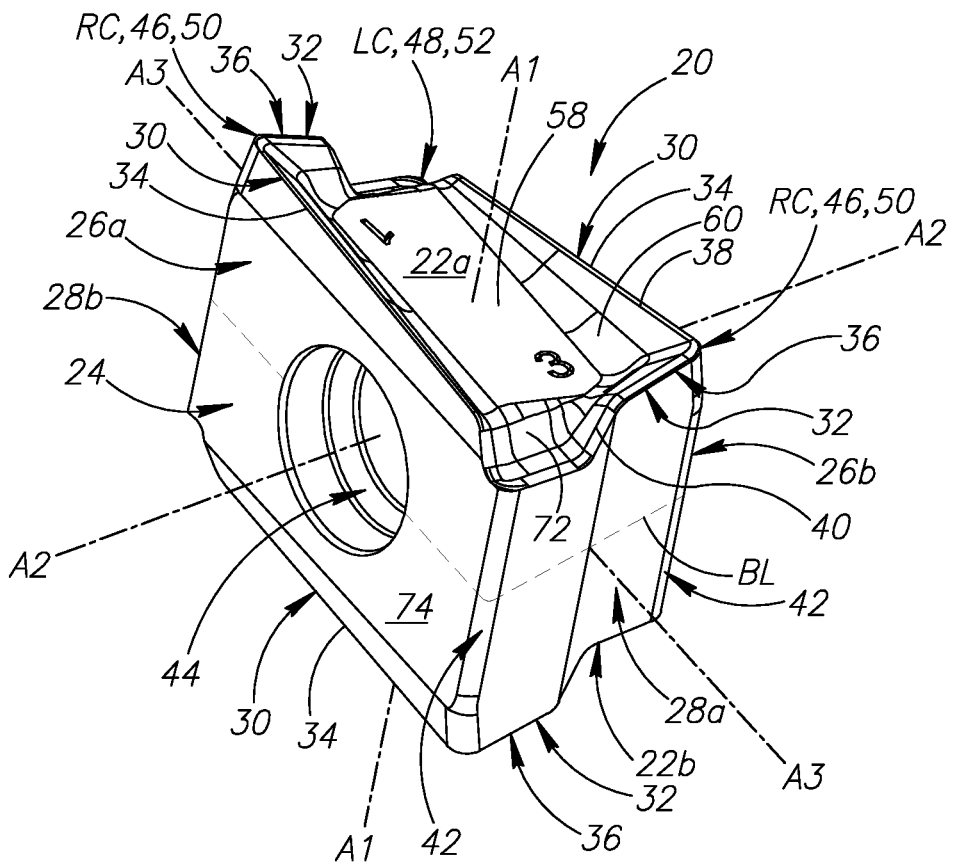
FIG. 1 is a perspective view of a cutting insert in accordance with some embodiments of the present invention.
Figure 2:
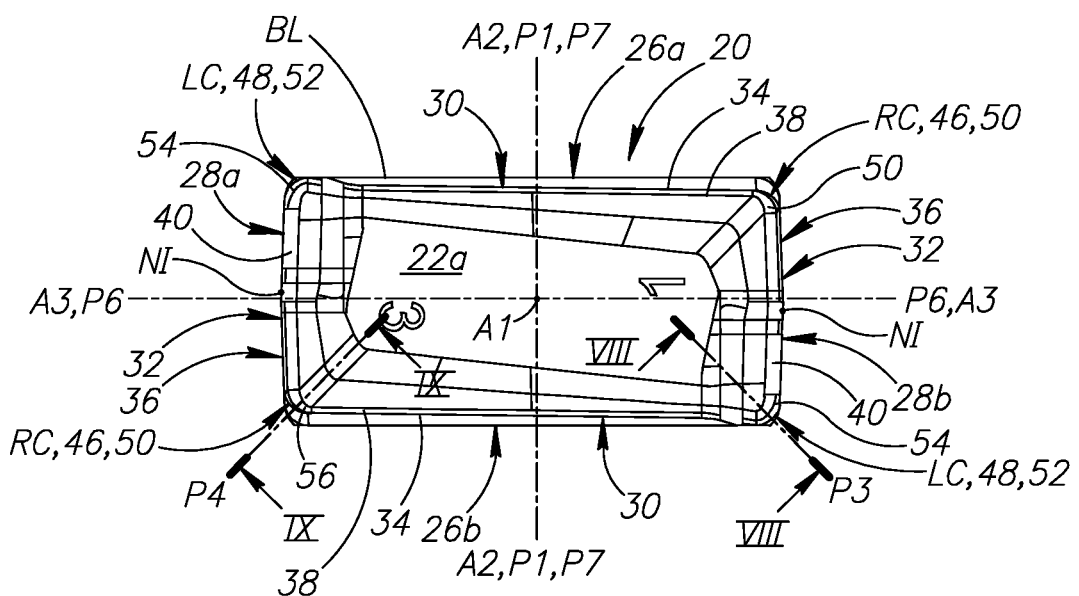
FIG. 2 is an end view of the cutting insert shown in FIG. 1.

As shown in FIGS. 1 and 2, the peripheral side surface 24 has two opposing major side surfaces 26a, 26b and two minor side surfaces 28a, 28b, with a major edge 30 formed at the intersection of each major side surface 26a, 26b and each end surface 22a, 22b, and a minor edge 32 formed at the intersection of each minor side surface 28a, 28b and each end surface 22a, 22b.

It should be appreciated that a major cutting edge 34 is formed along at least a portion of each major edge 30, and a minor cutting edge 36 is formed along at least a portion of each minor edge 32.

It should be appreciated that by virtue of having cutting edges associated with both end surfaces 22a, 22b, the cutting insert 20 can be described as 'double-ended' or 'double-sided'.

In some embodiments of the present invention, each end surface 22a, 22b may include a major land surface 38 immediately adjacent each of its associated major cutting edges 34.

Also, in some embodiments of the present invention, each end surface 22a, 22b may include a minor land surface 40 immediately adjacent each of its associated minor cutting edges 36.

Further, in some embodiments of the present invention, the peripheral side surface 24 may include four convexly curved corner surfaces 42 alternating with the two major side surfaces 26a, 26b and the two minor side surfaces 28a, 28b.

As shown in FIGS. 1 and 2, a second insert axis A2 passes through the two major side surfaces 26a, 26b (or more precisely, passes through planes defined by the major side surfaces).

In some embodiments of the present invention, an insert through bore 44 may extend along the second insert axis A2 and intersect the two major side surfaces 26a, 26b.

The second insert axis A2 may be perpendicular to and intersect the first insert axis A1.

It should be appreciated that by virtue of having the insert through bore 44 intersecting the two major side surfaces 26a, 26b, the cutting insert 20 can be retained in a rotary cutting tool in a 'tangential' manner as known in the art, and thus described as a 'tangential' cutting insert.

As shown in FIGS. 1 to 4, a median plane M perpendicular to the first insert axis A1 intersects the peripheral side surface 24 to form an insert boundary line BL, and each end surface 22a, 22b has two diagonally opposed raised corners RC and two diagonally opposed lowered corners LC with respect to the median plane M.

In some embodiments of the present invention, the second insert axis A2 may be contained in the median plane M.

Also, in some embodiments of the present invention, the two diagonally opposed raised corners RC associated with each end surface 22a, 22b may be located an equal distance from the median plane M.

Further, in some embodiments of the present invention, the cutting insert 20 may be indexable about the second insert axis A2.

Yet further, in some embodiments of the present invention, the cutting insert 20 may exhibit rotational symmetry about the second insert axis A2.

As shown in FIGS. 1 and 2, each raised corner RC has a convexly curved raised corner edge 46 formed at the intersection of the peripheral side surface 24 and its associated end surface 22a, 22b, and each lowered corner LC has a convexly curved lowered corner edge 48 formed at the intersection the peripheral side surface 24 and its associated end surface 22a, 22b.

In some embodiments of the present invention, each raised corner edge 46 may be formed at the intersection of one of the four corner surfaces 42 and its associated end surface 22a, 22b, and each lowered corner edge 48 may be formed at the intersection of one of the four corner surfaces 42 and its associated end surface 22a, 22b.

It should be appreciated that a raised corner cutting edge 50 is formed along at least a portion of each raised corner edge 46, and a lowered corner cutting edge 52 is formed along at least a portion of each lowered corner edge 48.

In some embodiments of the present invention, each raised corner cutting edge 50 may extend the entire length of its associated raised corner edge 46.

Also, in some embodiments of the present invention, each end surface 22a, 22b may include a raised corner land surface 56 immediately adjacent each of its associated raised corner cutting edges 50.

Further, in some embodiments of the present invention, each end surface 22a, 22b may include a lowered corner land surface 54 immediately adjacent each of its associated lowered corner cutting edges 52.

Figure 4:
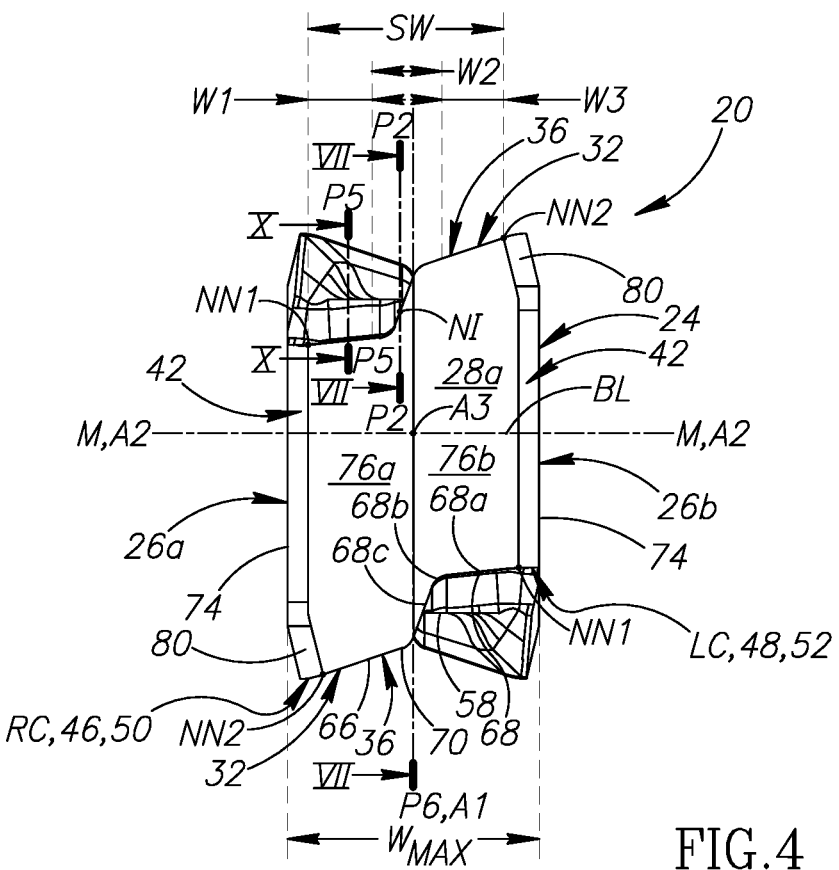
FIG. 4 is a minor side view of the cutting insert shown in FIG. 1.

As shown in FIGS. 2 and 4, each lowered corner edge 48 may adjoin one of the minor edges 32 at a first minor point NN1, and each raised corner edge 46 may adjoin one of the minor edges 32 at a second minor point NN2.

In some embodiments of the present invention, each minor cutting edge 36 may extend the entire length of its associated minor edge 32.

Also, in some embodiments of the present invention, as shown in FIG. 4, each minor edge 32 may continuously slope towards the median plane M from its associated raised corner edge 46 to its associated lowered corner edge 48.

As shown in FIG. 2, in an end view of the cutting insert 20, each minor edge 32 may be tangential to its adjoining raised corner edge 46 and tangential to its adjoining lowered corner edge 48.

As shown in FIGS. 1 and 2, each end surface 22*a*, 22*b* has a recessed central surface 58.

In some embodiments of the present invention, each recessed central surface 58 may be planar and parallel to the median plane M.

Also, in some embodiments of the present invention, each lowered corner edge 48 may be entirely located closer to the median plane M than its associated recessed central surface 58.

Further, in some embodiments of the present invention, each raised corner edge 46 may be entirely located further from the median plane M than its associated recessed central surface 58.

Figure 3:
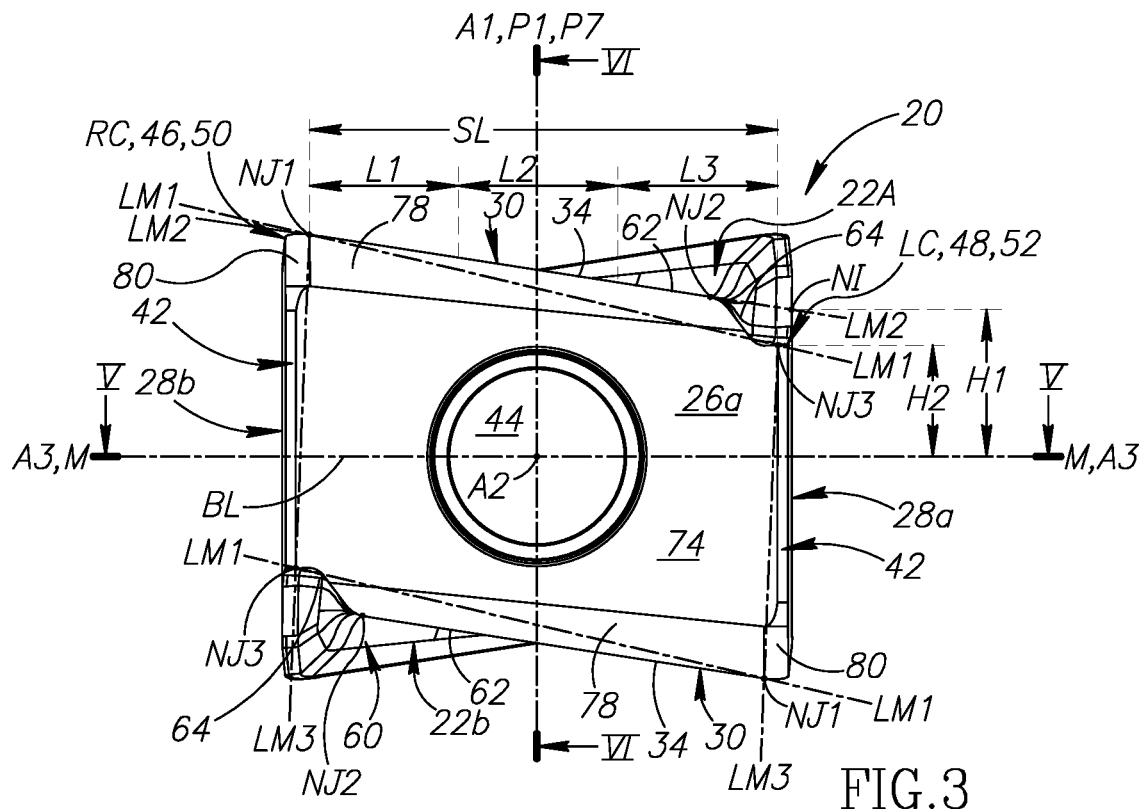
FIG. 3 is a major side view of the cutting insert shown in FIG. 1.

As shown in FIG. 3, each raised corner edge 46 adjoins one of the major edges 30 at a first major point NJ1, and each lowered corner edge 48 adjoins one of the major edges 30 at a third major point NJ3.

Also, as shown in FIG. 3, in a major side view of the cutting insert 20, the first and third major points NJ1, NJ3 of each major edge 30 define a major side length SL measured parallel to the median plane M, and the major side length SL is divided into equal first, second and third length portions L1, L2, L3, in which the first length portion L1 is delimited by the first major point NJ1 and the third length portion L3 is delimited by the third major point NJ3.

In some embodiments of the present invention, each major cutting edge 34 may extend at least the entire extent of its associated first and second length portions L1, L2.

Also, in some embodiments of the present invention, each end surface 22*a*, 22*b* may include a major rake surface 60 adjacent each of its associated major cutting edges 34.

It should be appreciated that in some embodiments of the present invention, each major rake surface 60 may be spaced apart from its associated major cutting edge 34 by its associated major land surface 38.

As shown in FIG. 3, in a major side view of the cutting insert 20, each major edge 30 has an associated first imaginary straight line LM1 containing its first and third major points NJ1, NJ3 and an elevated edge portion 62. The elevated edge portion 62 is located on one side of the first imaginary straight line LM1 whilst the insert boundary line BL is located on the other side of the first imaginary straight line LM1.

In some embodiments of the present invention, each elevated edge portion 62 may extend to the first major point NJ1 of its associated major edge 30.

Also, in some embodiments of the present invention, each elevated edge portion 62 may not extend to the third major point NJ3 of its associated major edge 30.

As shown in FIG. 4, in a minor side view of the cutting insert 20, the first and second minor points NN1, NN2 of each minor edge 32 define a minor side width SW measured parallel to the median plane M.

In some embodiments of the present invention, the major side length SL of each major edge 30 may be greater than the minor side width SW of each minor edge 32, i.e. SL>SW.

Figure 5:
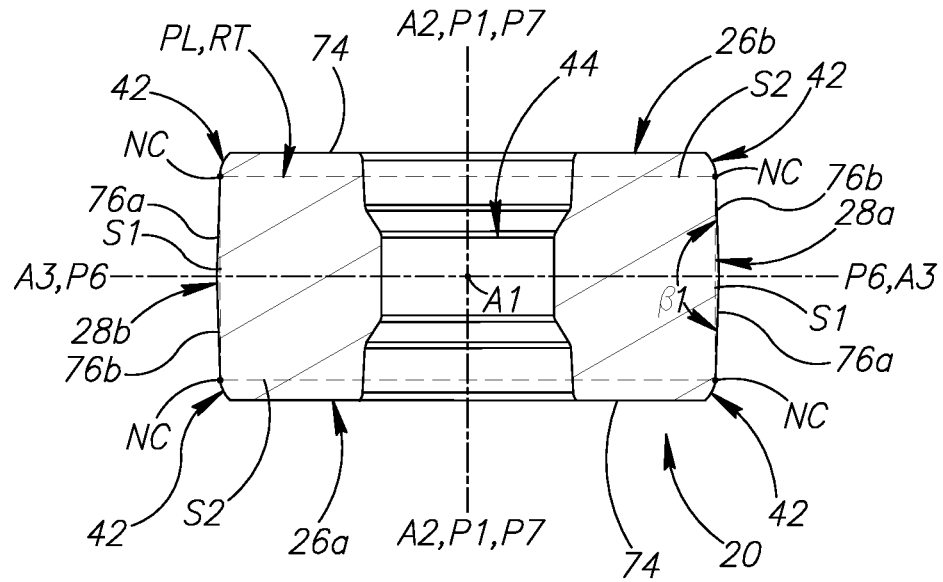
FIG. 5 is a cross-sectional view of the cutting insert shown in FIG. 3, taken along the line V-V.

As shown in FIG. 5, in a cross-section taken in the median plane M and intersecting the four corner surfaces 42, the four corner surfaces 42 adjoin the two minor side surfaces 28*a*, 28*b* at four corner points NC.

Also, as shown in FIG. 5, the four corner points NC may define an imaginary parallelogram PL having first and second pairs of imaginary parallel sides S1, S2.

In some embodiments of the present invention, the first pair of imaginary parallel sides S1 may be perpendicular to the major side length SL of each major edge 30.

Also, in some embodiments of the present invention, the first and second pairs of imaginary parallel sides S1, S2 may define an imaginary rectangle RT. The elements of the first pair of sides S1 are shorter than the elements of the second pair of sides S2.

It should be appreciated that in some embodiments of the present invention, in a cross-section taken in any plane parallel to the median plane M and intersecting the four corner surfaces 42, the four points at which the four corner surfaces 42 adjoin the two minor side surfaces 28*a*, 28*b* may define an imaginary parallelogram having first and second pairs of imaginary parallel sides, and the first pair of imaginary parallel sides may be perpendicular to the major side length SL of each major edge 30.

Figure 6:
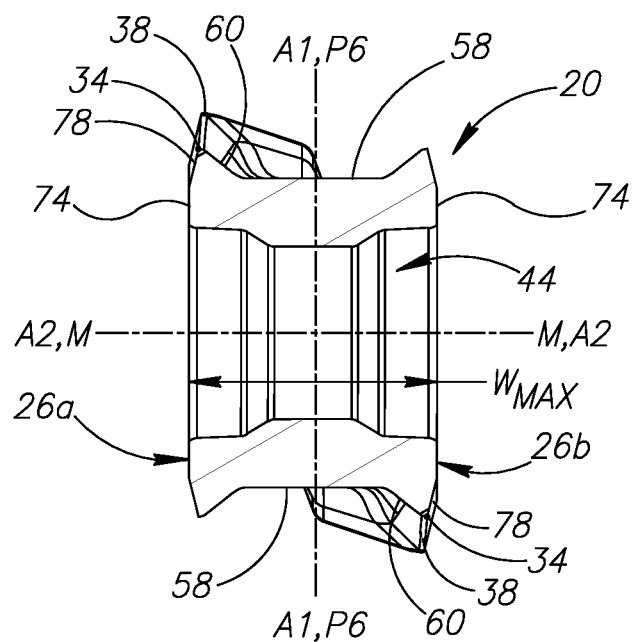
FIG. 6 is a cross-sectional view of the cutting insert shown in FIG. 3, taken along the line VI-VI.

As shown in FIG. 6, in a cross-section taken in a first plane P1 intersecting one of the major cutting edges 34 and located along its associated second length portion L2, the adjacent major rake surface 60 may slope towards the median plane M whilst extending away from said one of the major cutting edges 34.

Also, as shown in FIG. 6, in the cross-section taken in the first plane P1, said one of the major cutting edges 34 may be located further from the median plane M than its associated recessed central surface 58.

In some embodiments of the present invention, the first plane P1 may be perpendicular to the median plane M.

Also, in some embodiments of the present invention, the first plane P1 may contain the second insert axis A2.

It should be appreciated that in some embodiments of the present invention, in a cross-section taken in any plane intersecting one of the major cutting edges 34 and located along its associated second length portion L2, the adjacent major rake surface 60 may slope towards the median plane M whilst extending away from said one major cutting edge 34.

According to the present invention, as shown in FIG. 3, in a major side view of the cutting insert 20, each elevated edge portion 62 has a second major point NJ2 located furthest from its associated first imaginary straight line LM1, the second major point NJ2 being located in the third length portion L3 of its associated major side length SL.

It should be appreciated that use of the term "furthest" in the preceding paragraph, refers to each second major point NJ2 being located further from its associated first imaginary straight line LM1 than any other point along it associated elevated edge portion 62.

In some embodiments of the present invention, each major cutting edge 34 may extend from its associated first major point NJ1 to its associated second major point NJ2.

Also, in some embodiments of the present invention, each major edge 30 may include a non-cutting sub-portion 64 extending between its associated second major point NJ2 and its associated third major point NJ3.

It should be appreciated that for embodiments of the present invention in which each major cutting edge 34 extends from its associated first major point NJ1 to its associated second major point NJ2 in the third length portion L3 of its associated major side length SL, milling operations can be advantageously performed at large cutting depths.

As shown in FIG. 3, in a major side view of the cutting insert 20, each major edge 30 has an associated second imaginary straight line LM2 containing its first and second major points NJ1, NJ2 and intersecting one of the minor cutting edges 36 at a projected intersection point NI.

As seen by comparing FIGS. 3 and 4, the projected intersection point NI is not collinear with the first and second major points NJ1, NJ2 in three-dimensional space.

It should be appreciated that in some embodiments of the present invention, each end surface 22a, 22b may have two projected intersection points NI associated therewith.

Figure 7:
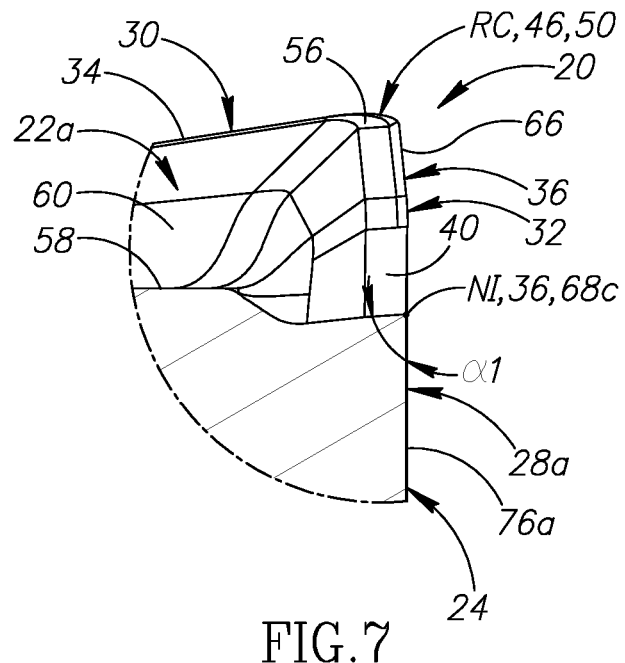
FIG. 7 is a cross-sectional view of the cutting insert shown in FIG. 4, taken along the line

As shown in FIG. 7, in a cross-section taken in a second plane P2 located (passing) in-between the two major side surfaces 26a, 26b and containing one of the projected intersection points NI, the adjacent minor land surface 40 may form an internal minor cutting angle α1 with the adjacent minor side surface 28a, 28b, and the minor cutting angle α1 may be at least 65 degrees and at most 115 degrees, i.e. 65°≤α1≤115°.

It should be appreciated that use of the term "internal angle" throughout the description and claims refers to an angle between two surface components as measured internal to the member on which these components are formed.

In some embodiments of the present invention, the second plane P2 may be perpendicular to the median plane M.

Also, in some embodiments of the present invention, the second plane P2 may contain two projected intersection points NI, namely, one projected intersection point NI associated with each end surface 22a, 22b.

It should be appreciated that in some embodiments of the present invention, in a cross-section taken in any plane located (passing) in-between the two major side surfaces 26a, 26b and intersecting one of the minor cutting edges 36, the adjacent minor land surface 40 may form an internal minor cutting angle α1 with the adjacent minor side surface 28a, 28b, and the minor cutting angle α1 may be at least 65 degrees and at most 115 degrees, i.e. 65°≤α1≤115°.

Figure 8:
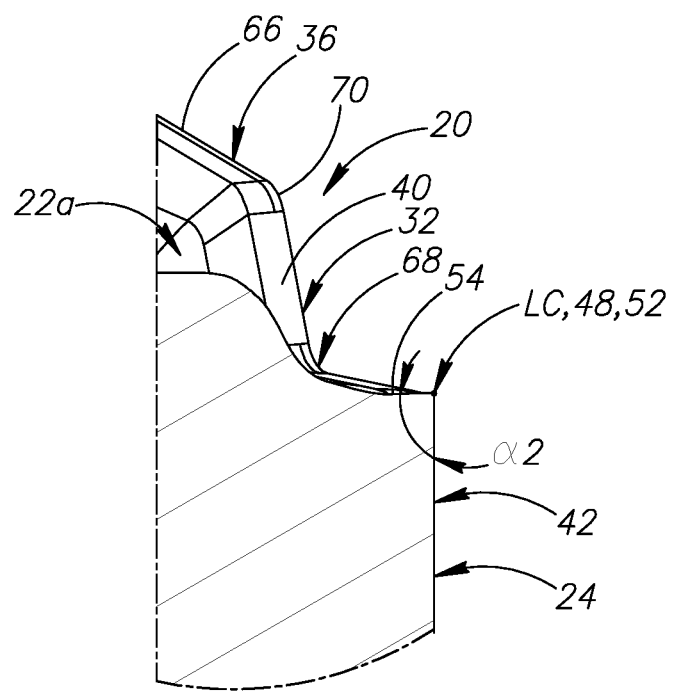
FIG. 8 is a cross-sectional view of the cutting insert shown in FIG. 2, taken along the line

As shown in FIG. 8, in a cross-section taken in a third plane P3 parallel to the first insert axis A1 and intersecting one of the lowered corner cutting edges 52, the adjacent lowered corner land surface 54 may form an internal lower cutting angle α2 with the peripheral side surface 24, and the lower cutting angle α2 may be at least 65 degrees and at most 115 degrees, i.e. 65°≤α2≤115°.

Figure 9:
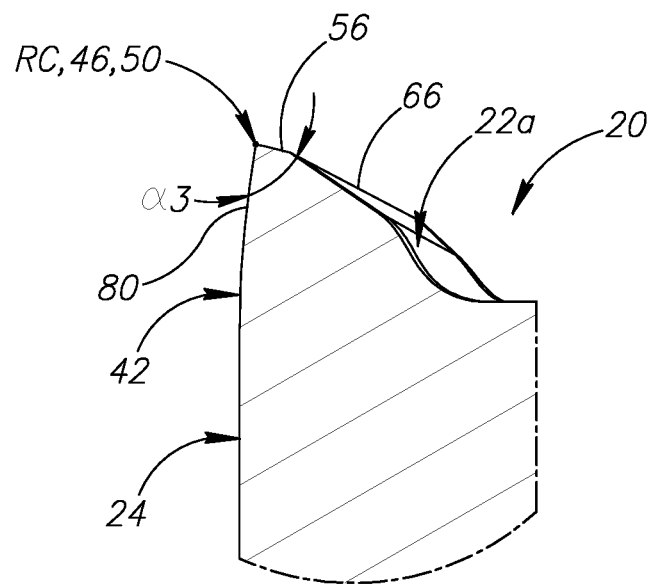
FIG. 9 is a cross-sectional view of the cutting insert shown in FIG. 2, taken along the line IX-IX.

As shown in FIG. 9, in a cross-section taken in a fourth plane P4 parallel to the first insert axis A1 and intersecting one of the raised corner cutting edges 50, the adjacent raised corner land surface 56 may form an internal raised cutting angle α3 with the peripheral side surface 24, and the raised cutting angle α3 may be at least 65 degrees and at most 115 degrees, i.e. 65°≤α3≤115°.

As shown in FIG. 4, in a minor side view of the cutting insert 20, the minor side width SW of each minor edge 32 is divided into equal first, second and third width portions W1, W2, W3, in which the first width portion W1 is delimited by the first minor point NN1 and the third width portion W3 is delimited by the second minor point NN2.

In some embodiments of the present invention, each projected intersection point NI may be located in the second width portion W2 of its associated minor side width SW.

As shown in FIG. 2, in an end view of the cutting insert 20, each projected intersection point NI may be coincident with the insert boundary line BL.

Also, as shown in FIG. 2, in an end view of the cutting insert 20, each minor edge 32 may be coincident with the insert boundary line BL.

In some embodiments of the present invention, each minor side surface 28a, 28b may be perpendicular to the median plane M.

It should be appreciated that configuring the minor side surfaces 28a, 28b to be perpendicular to the median plane M, as opposed to having outwardly inclined sub-surfaces extending away from the minor edges 32, enables the cutting insert 20 to be oriented with a greater range of flexibility opposite a workpiece, whilst providing sufficient clearance adjacent the operative minor cutting edge 36.

In other embodiments of the invention (not shown), for example, in which each minor side surface 28a, 28b includes a lateral groove located midway between the end surfaces 22a, 22b and extending parallel to the second insert axis A2, in an end view of the cutting insert 20, each projected intersection point NI may be located outside the insert boundary line BL.

Also, in other embodiments of the present invention, in an end view of the cutting insert 20, each minor edge 32 may be located outside the insert boundary line BL.

As shown in FIG. 3, each projected intersection point NI may be located further from the median plane M than its adjacent third major point NJ3.

Configuring each projected intersection point NI to be located further from the median plane M than its adjacent third major point NJ3 results in at least a portion of its associated minor cutting edge 36 being located closer to the median plane M than the projected intersection point NI, which makes the cutting insert 20 suitable for performing ramping operations, also known as ramp-down, or ramp milling operations.

Also, as shown in FIG. 3, each projected intersection point NI is located a first height H1 from the median plane M, and each third major point NJ3 is located a second height H2 from the median plane M.

In some embodiments of the present invention, the first height H1 may be at least 120 percent of the second height H2, i.e. H1≥1.2*H2.

Also, in some embodiments of the present invention, the first height H1 may preferably be at least 150 percent of the second height H2, i.e. H1≥1.5*H2.

It should be appreciated that for embodiments of the present invention in which the first height H1 is at least 150 percent of the second height H2, the cutting insert 20 may be used to perform ramping operations at increased ramping angles.

Further, in some embodiments of the present invention, the first height H1 may be no more than 220 percent of the second height H2, i.e. H1≤2.2*H2.

In a minor side view of the cutting insert 20, as shown in FIG. 4, each minor cutting edge 36 may include a wiping edge portion 66 adjoining its associated raised corner edge 46, a ramping edge portion 68 adjoining its associated lowered corner edge 48, and a convexly shaped joining edge portion 70 extending between the wiping edge portion 66 and the ramping edge portion 68.

As shown in FIG. 4, in a minor side view of the cutting insert 20, each wiping edge portion 66 may be linear.

Also, as shown in FIG. 4, in a minor side view of the cutting insert 20, each ramping edge portion 68 may include a first ramping edge sub-portion 68a adjoining its associated lowered corner edge 48, a third ramping sub-portion 68c adjoining its associated joining edge portion 70, and a concavely shaped second ramping edge sub-portion 68b extending between the first and third ramping edge sub-portions 68a, 68c.

In some embodiments of the present invention, each projected intersection point NI may be located on the third ramping sub-portion 68c of its associated minor cutting edge 36.

It should be appreciated that each joining edge portion 70 may operate as a 'fourth' ramping edge sub-portion and participate in performing ramping operations.

It should also be appreciated that each lowered corner cutting edge 52 may participate in performing ramping operations.

In some embodiments of the present invention, each first ramping edge sub-portion 68a may be entirely located closer to the median plane M than its associated recessed central surface 58.

Also, in some embodiments of the present invention, each end surface 22a, 22b may include a minor ramp surface 72 adjacent each first ramping edge sub-portion 68a.

Figure 10:
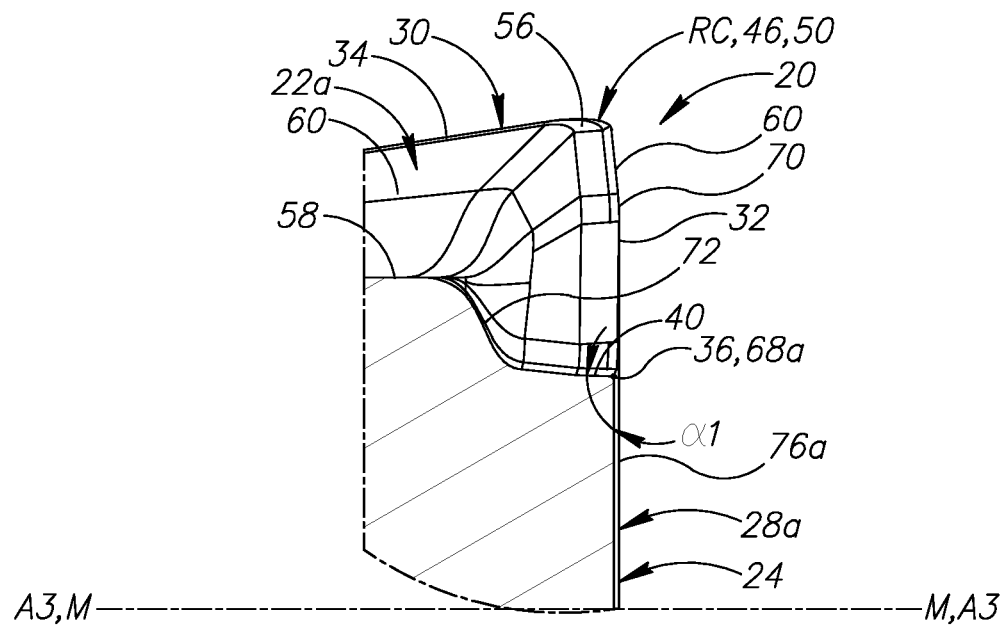
FIG. 10 is a cross-sectional view of the cutting insert shown in FIG. 4, taken along the line X-X.
Figure 11:
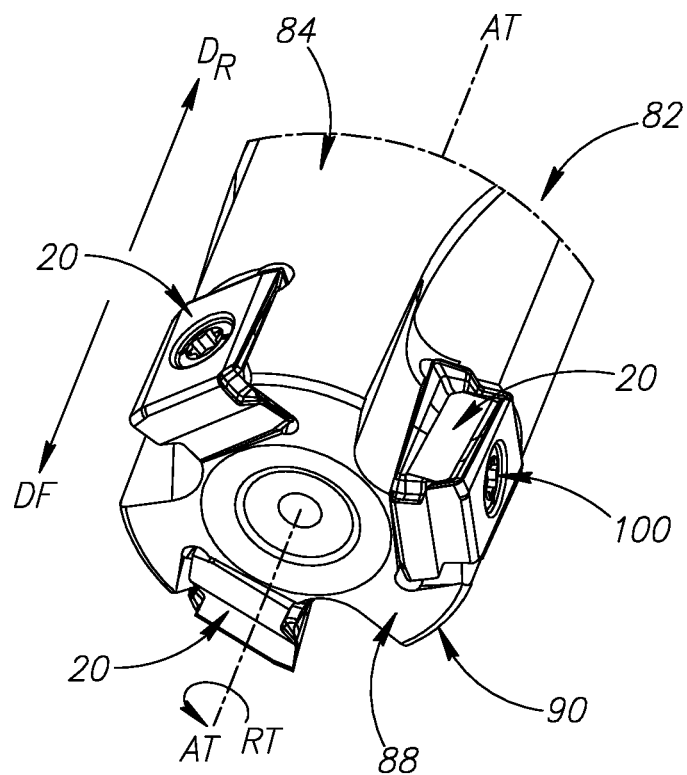
FIG. 11 is a perspective view of a cutting tool in accordance with some embodiments of the present invention.

It should be appreciated that in some embodiments of the present invention, as seen in e.g., FIG. 10, each minor ramp surface 72 may be spaced apart from its associated first ramping edge sub-portion 68a by its associated minor land surface 40.

As shown in FIG. 10, in a cross-section taken in a fifth plane P5 located (passing) in-between the two major side surfaces 26a, 26b and intersecting one of the first ramping edge sub-portions 68a, the adjacent minor ramp surface 72 may slope away from the median plane M whilst extending away from said one of the first ramping edge sub-portions 68a.

In some embodiments of the present invention, each minor ramp surface 72 may slope towards its associated recessed central surface 58 whilst extending away from its associated first ramping edge sub-portion 68a.

Also, in some embodiments of the present invention, the fifth plane P5 may be perpendicular to the median plane M.

It should be appreciated that in some embodiments of the present invention, the minor ramp surface 72 advantageously provides a compact and efficient means for chip evacuation during ramping operations.

It should also be appreciated that in some embodiments of the present invention, in a cross-section taken in any plane located (passing) in-between the two major side surfaces 26a, 26b and intersecting one of the first ramping edge sub-portions 68a, the adjacent minor ramp surface 72 may slope away from the median plane M whilst extending away from said one of the first ramping edge sub-portions 68a.

As shown in FIGS. 2 and 4, each major side surface 26a, 26b may have a major outer surface 74 perpendicular to the second axis A2.

In some embodiments of the present invention, the two major outer surfaces 74 may define a maximum insert width $W_{MAX}$ of the cutting insert 20.

As shown in FIGS. 2 and 4, a sixth plane P6 ("longitudinal insert plane") containing the first insert axis A1 may be located mid-way in-between the major side surfaces 26a, 26b and also mid-way in-between the two major outer surfaces 74.

The sixth plane P6 may be defined by the intersection of the first insert axis A1 and a third insert axis A3 which is perpendicular to the first insert axis A1 and passes through the minor side surfaces 28a, 28b. The third insert axis A3 may be contained in the median plane M. The third insert axis A3 may be perpendicular to the second insert axis A2.

Also, the second plane P2 and the fifth plane P5 may be parallel to the sixth plane P6.

In some embodiments of the present invention, each minor side surface 28a, 28b may include two minor sub-surfaces 76a, 76b located on opposite sides of the sixth plane P6.

Also, in some embodiments of the present invention, the two minor sub-surfaces 76a, 76b may form an internal obtuse minor abutment angle β1, and the minor abutment angle β1 may be greater than 160 degrees, i.e. β1>160°.

As shown in FIGS. 1 to 4, each major side surface 26a, 26b may include a major relief surface 78 immediately adjacent each of its associated major cutting edges 34.

As shown in FIG. 6, in a cross-section taken in a seventh plane P7 intersecting one of the major cutting edges 34, the adjacent major relief surface 78 may slope towards the median plane M whilst extending away from said one of the major cutting edges 34.

In some embodiments of the present invention, the seventh plane P7 may be perpendicular to the sixth plane P6.

Also, in some embodiments of the present invention, the seventh plane P7 may be coincident with the first plane P1.

As shown in FIG. 6, in the cross-section taken in the seventh plane P7, the adjacent major relief surface 78 may slope away from the sixth plane P6 whilst extending away from its associated major cutting edge 34.

It should be appreciated that by virtue of each major relief surface 78 sloping away from the sixth plane P6 whilst extending away from its associated major cutting edge 34, each major relief surface 78 may be described as a 'reversed-relief' surface.

In some embodiments of the present invention, each major relief surface 78 may intersect one of the major outer surfaces 74.

As shown in FIGS. 1 to 4, each corner surface 42 may include a raised corner relief surface 80 immediately adjacent its associated raised corner cutting edge 50.

It should be appreciated that each raised corner relief surface 80 may merge with its adjacent major relief surface 78.

In some embodiments of the present invention, in a major side view of the cutting insert 20, as shown in FIG. 3, each corner surface 42 may have an associated third imaginary straight line LM3 containing its first and third major points NJ1, NJ3, and each third imaginary straight line LM3 may be inclined with respect to the first insert axis A1.

It should be appreciated that for embodiments in which each third imaginary straight line LM3 is inclined with respect to the first insert axis A1, in a major side view of the cutting insert 20, the two major side lengths SL associated with each major side surface 26a, 26b may be mutually offset.

As shown in FIGS. 11 to 14, another aspect of the present invention relates to a rotary cutting tool 82 rotatable about a tool axis AT in a direction of rotation RT.

The rotary cutting tool 82 comprises a cutting body 84 and at least one of the aforementioned cutting inserts 20, whereby each cutting insert 20 is removably secured in an insert receiving pocket 86 of the cutting body 84.

Figure 13:
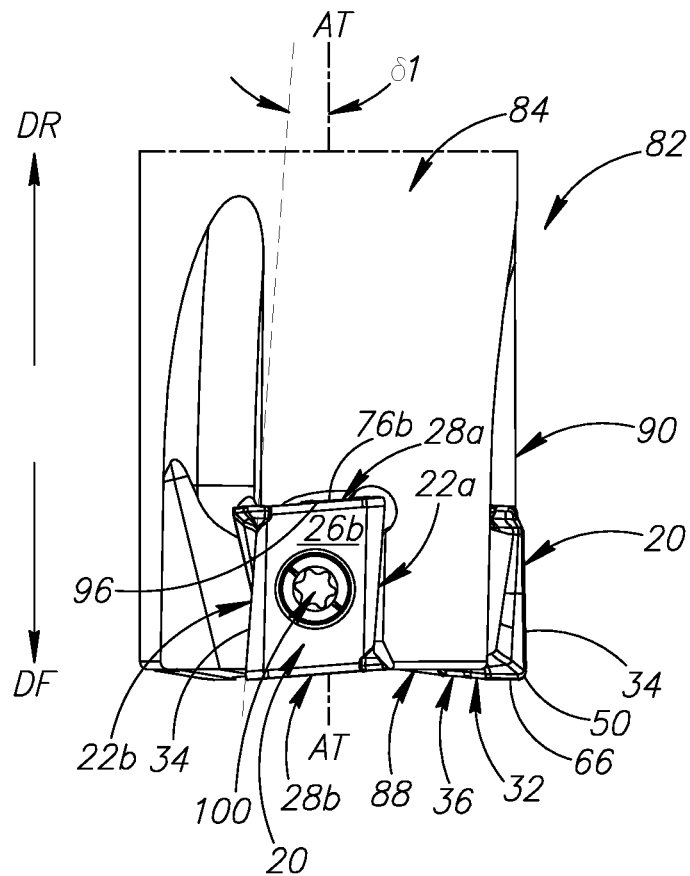
FIG. 13 is a side view of the cutting tool shown in FIG. 11.
Figure 14:
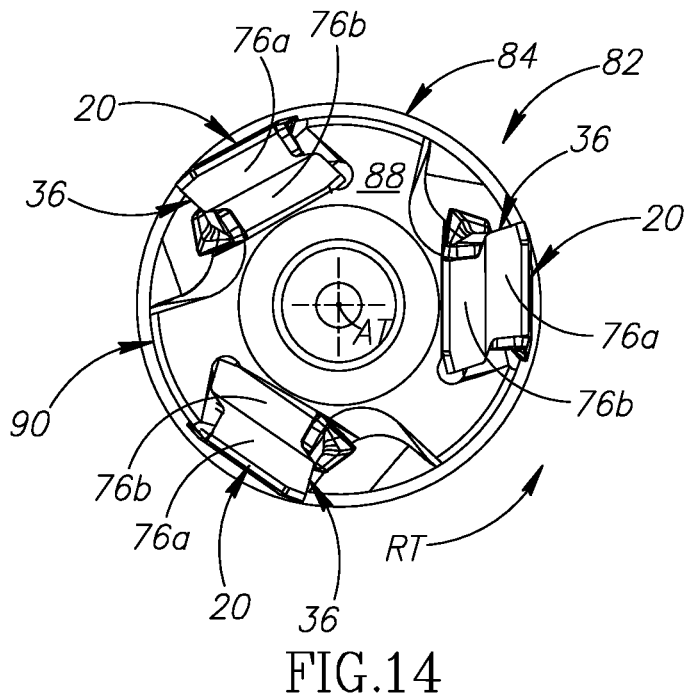
FIG. 14 is an end view of the cutting tool shown in FIG. 11.

As shown in FIG. 13, the tool axis AT defines a forward-rearward direction DF, DR, and each insert receiving pocket 86 opens out at a forward end surface 88 of the cutting body 84.

In some embodiments of the present invention, the cutting body 84 may be cylindrical shaped and have a circumferential wall 90 extending in the rearward direction DR from the forward end surface 88.

Also, in some embodiments of the present invention, the rotary cutting tool 82 may be used for milling operations.

Figure 12:
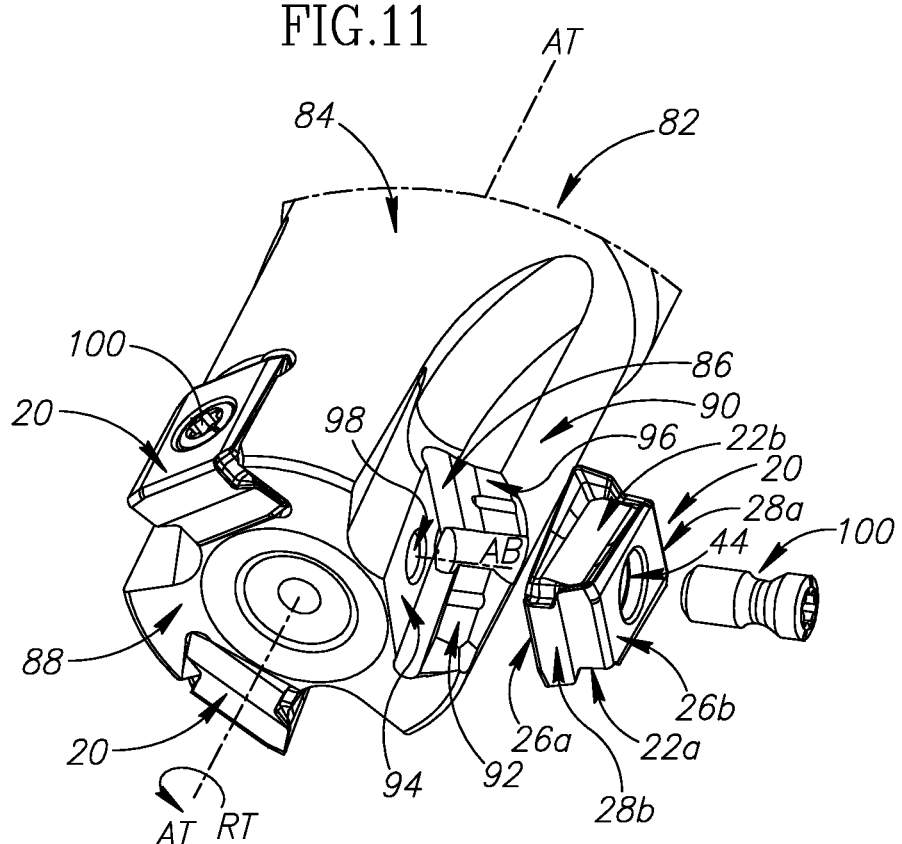
FIG. 12 is an exploded perspective view of the cutting tool shown in FIG. 11.

As shown in FIG. 12, the insert receiving pocket 86 may have a seat surface 92 facing in the direction of rotation RT, a radially outward facing first pocket wall 94 transverse to the seat surface 92, and an axially forward facing second pocket wall 96 transverse to the seat surface 92.

In some embodiments of the present invention, the second pocket wall 96 may intersect the circumferential wall 90.

Also, in some embodiments of the present invention, the seat surface 92 may include a threaded bore 98 extending along a bore axis AB.

As shown in FIGS. 11 to 14, in the assembled position of the rotary cutting tool 82;
one of the two end surfaces 22a, 22b may be in contact with the seat surface 92;
one of the two major side surfaces 26a, 26b may be in contact with the first pocket wall 94; and
one of the two minor side surfaces 28a, 28b may be in contact with the second pocket wall 96.

In some embodiments of the present invention, the recessed central surface 58 of one of the end surfaces 22a, 22b may be in contact with the seat surface 92.

Also, in some embodiments of the present invention, the major outer surface 74 of one of the two major side surfaces 26a, 26b may be in contact with the first pocket wall 94.

Further, in some embodiments of the present invention, only one of the two minor sub-surfaces 76a, 76b of one of the two minor side surfaces 28a, 28b may be in contact with the second pocket wall 96.

Yet further, in some embodiments of the present invention, the single minor sub-surface 76a, 76b in contact with the second pocket wall 96 may be adjacent the major side surface 26a, 26b not in contact with the first pocket wall 94.

As shown in FIGS. 11 to 14, in the assembled position of the rotary cutting tool 82;
a clamping screw 100 may pass through the insert through bore 44 and threadingly engage the threaded bore 98.

In some embodiments of the present invention, the second insert axis A2 may be non-coaxial with the bore axis AB.

It should be appreciated that for embodiments of the present invention in which the first height H1 is no more than 220 percent of the second height H2, a sufficient portion of the single minor sub-surface 76a, 76b in contact with the second pocket wall 96 may be located rotationally ahead of the bore axis AB to enable stable clamping.

It should also be appreciated that for embodiments of the present invention in which the second insert axis A2 is non-coaxial with the bore axis AB, the insert through bore 44 may be eccentric in relation to the threaded bore 98.

It should be further appreciated that the eccentric relationship of the insert through bore 44 in relation to the threaded bore 98 promotes contact between one of the two end surfaces 22a, 22b and the seat surface 92, and one of the two minor side surfaces 28a, 28b and the second pocket wall 96, on tightening of the clamping screw 100.

As shown in FIG. 13, the operative major cutting edge 34 of each cutting insert 20 may form a positive axial rake angle δ1 with respect to the tool axis AT.

In some embodiments of the present invention, the operative major cutting edge 34, together with the adjacent raised corner cutting edge 50 and wiping edge portion 66, may be configured to performing square shoulder milling operations in a workpiece (not shown).

As shown in FIG. 13, the entire operative minor cutting edge 36 of each cutting insert 20 may be located axially forward of the forward end surface 88.

It should be appreciated that for embodiments of the present invention in which each minor cutting edge 36 extends the entire length of its associated minor edge 32, and the operative minor cutting edge 36 of each cutting insert 20 is entirely located axially forward of the forward end surface 88, the rotary cutting tool 82 may be particularly suitable for performing ramping operations.

Although the present invention has been described to a certain degree of particularity, it should be understood that various alterations and modifications could be made without departing from the spirit or scope of the invention as hereinafter claimed.

What is claimed is:

1. A cutting insert (20), comprising:
two opposing end surfaces (22a, 22b) interconnected by a peripheral side surface (24) and an insert axis (A1) passing through the opposing end surfaces (22a, 22b),
each end surface (22a, 22b) having a recessed central surface (58),
the peripheral side surface (24) having two opposing major side surfaces (26a, 26b), two minor side surfaces (28a, 28b), and four convexly curved corner surfaces (42) alternating with the two major side surfaces (26a, 26b) and the two minor side surfaces (28a, 28b),
a major edge (30) formed at the intersection of each major side surface (26a, 26b) and each end surface (22a, 22b), and a major cutting edge (34) formed along at least a portion of each major edge (30),
a minor edge (32) formed at the intersection of each minor side surface (28a, 28b) and each end surface (22a, 22b), and a minor cutting edge (36) formed along at least a portion of each minor edge (32),
a median plane (M) perpendicular to the first insert axis (A1) and intersecting the peripheral side surface (24) to form an insert boundary line (BL), and
each end surface (22a, 22b) having two diagonally opposed raised corners (RC) and two diagonally opposed lowered corners (LC) with respect to the median plane (M),
each raised corner (RC) having a convexly curved raised corner edge (46) formed at the intersection of one of said four convexly curved corner surfaces (42) and its associated end surface (22a, 22b), each raised corner edge (46) adjoining one of the major edges (30) at a first major point (NJ1), each raised corner (RC) further having a raised corner cutting edge (50) formed along at least a portion of each raised corner edge (46),
each lowered corner (LC) having a convexly curved lowered corner edge (48) formed at the intersection of one of said four convexly curved corner surfaces (42) and its associated end surface (22a, 22b), each lowered corner edge (48) adjoining one of the major edges (30) at a third major point (NJ3), each lowered corner edge (48) being entirely located closer to the median plane (M) than its associated central recessed surface (58), each lowered corner (LC) further having a lowered corner cutting edge (52) formed along at least a portion of each lowered corner edge (48), wherein in a major side view of the cutting insert (20):
the first and third major points (NJ1, NJ3) of each major edge (30) define a major side length (SL) measured parallel to the median plane (M), the major side length (SL) being divided into equal first, second and third length portions (L1, L2, L3), in which the first length portion (L1) is delimited by the first major point (NJ1) and the third length portion (L3) is delimited by the third major point (NJ3), each major edge (30) has an associated first imaginary straight line (LM1) containing its first and third major points (NJ1, NJ3) and an elevated edge portion (62), the elevated edge portion (62) being located on one side of the first imaginary straight line (LM1) and the insert boundary line (BL) being located on the other side of the first imaginary straight line (LM1), and each elevated edge portion (62) has a second major point (NJ2) located: (i) furthest from its associated first imaginary straight line (LM1), and (ii) in the third length portion (L3) of its associated major side length (SL).

2. The cutting insert (20) according to claim 1, wherein in a major side view of the cutting insert (20):
each major edge (30) has an associated second imaginary straight line (LM2) containing its first and second major points (NJ1, NJ2) and intersecting one of the minor cutting edges (36) at a projected intersection point (NI), and
each projected intersection point (NI) is located further from the median plane (M) than its adjacent third major point (NJ3).

3. The cutting insert (20) according to claim 2, wherein:
each end surface (22a, 22b) includes a minor land surface (40) immediately adjacent each of its associated minor cutting edges (36), and
in a cross-section taken in a second plane (P2) located in-between the two major side surfaces (26a, 26b) and containing one of the projected intersection points (NI), the adjacent minor land surface (40) forms an internal minor cutting angle (α1) with an adjacent minor side surface (28a, 28b), and the minor cutting angle (α1) is at least 65 degrees and at most 115 degrees.

4. The cutting insert (20) according to claim 2, wherein:
each projected intersection point (NI) is located a first height (H1) from the median plane (M),
each third major point (NJ3) is located a second height (H2) from the median plane (M), and
the first height (H1) is at least 120 percent of the second height (H2).

5. The cutting insert (20) according to claim 4, wherein:
the first height (H1) is no more than 220 percent of the second height (H2).

6. The cutting insert (20) according to claim 1, wherein:
each end surface (22a, 22b) includes a minor land surface (40) immediately adjacent each of its associated minor cutting edges (36), and
in a cross-section taken in any plane located in-between the two major side surfaces (26a, 26b) and intersecting one of the minor cutting edges (36), the adjacent minor land surface (40) forms an internal minor cutting angle (α1) with an adjacent minor side surface (28a, 28b), and the minor cutting angle (α1) is at least 65 degrees and at most 115 degrees.

7. The cutting insert (20) according to claim 1, wherein in an end view of the cutting insert (20), each minor edge (32) is either coincident with the insert boundary line (BL) or located outside the insert boundary line (BL).

8. The cutting insert (20) according to claim 1, wherein each minor cutting edge (36) extends the entire length of its associated minor edge (32).

9. The cutting insert (20) according to claim 1, wherein in a cross-section taken in the median plane (M) and intersecting the four corner surfaces (42):
the four corner surfaces (42) adjoin the two minor side surfaces (28a, 28b) at four corner points (NC),
the four corner points (NC) define an imaginary parallelogram (PL) having first and second pairs of imaginary parallel sides (S1, S2), and
the first pair of imaginary parallel sides (S1) are perpendicular to the major side length (SL) of each major edge (30).

10. The cutting insert (20) according to claim 1, wherein in a minor side view of the cutting insert (20), each minor cutting edge (36) includes:
a wiping edge portion (66) adjoining its associated raised corner edge (30),
a ramping edge portion (68) adjoining its associated lowered corner edge (34), and
a convexly shaped joining edge portion (70) extending between the wiping edge portion (66) and the ramping edge portion (68).

11. The cutting insert (20) according to claim 10, wherein in a minor side view of the cutting insert (20), each ramping edge portion (68) includes:
a first ramping edge sub-portion (68a) adjoining its associated lowered corner edge (48),
a third ramping sub-portion (68c) adjoining its associated joining edge portion (70), and
a concavely shaped second ramping edge sub-portion (68b) extending between the first and third ramping edge sub-portions (68a, 68c).

12. The cutting insert (20) according to claim 11, wherein:
each end surface (22a, 22b) includes a minor ramp surface (72) adjacent each first ramping edge sub-portion (68a), and
in a cross-section taken in a fifth plane (P5) located in-between the two major side surfaces (26a, 26b) and intersecting one of the first ramping edge sub-portions (68a), the adjacent minor ramp surface (72) slopes away from the median plane (M) whilst extending away from said one of the first ramping edge sub-portions (68a).

13. The cutting insert (20) according to claim 12, wherein in a cross-section taken in any plane located in-between the two major side surfaces (26a, 26b) and intersecting one of the first ramping edge sub-portions (68a), the adjacent minor ramp surface (72) slopes away from the median plane (M) whilst extending away from said one of the first ramping edge sub-portions (68a).

14. The cutting insert (20) according to claim 1, wherein the cutting insert (20) exhibits rotational symmetry about the first insert axis (A1).

15. The cutting insert (20) according to claim 1, wherein a second insert axis (A2) passes through the two major side surfaces (26a, 26b), and an insert through bore (44) extends along the second insert axis (A2) and intersects the two major side surfaces (26a, 26b).

16. The cutting insert (20) according to claim 15, wherein the cutting insert (20) exhibits rotational symmetry about the second insert axis (A2).

17. The cutting insert (20) according to claim 15, wherein:
- each major side surface (26a, 26b) has a major outer surface (74) perpendicular the second insert axis (A2), and
- the two major outer surfaces (74) define a maximum insert width (WMAX) of the cutting insert (20).

18. The cutting insert (20) according to claim 1, wherein each elevated edge portion (62) does not extend to the third major point (NJ3) of its associated major edge (30).

19. The cutting insert (20) according to claim 1, wherein each elevated edge portion (62) extends to the first major point (NJ1) of its associated major edge (30).

20. The cutting insert (20) according to claim 1, wherein in a cross-section taken in a first plane (P1) intersecting one of the major cutting edges (34) and located along its associated second length portion (L2) perpendicular to the median plane (M):
- the adjacent major rake surface (60) slopes towards the median plane (M) whilst extending away from said one of the major cutting edges (34), and
- said one of the major cutting edges (34) is located further from the median plane (M) than its associated recessed central surface (58).

21. A rotary cutting tool (82) rotatable about a tool axis (AT) in a direction of rotation (RT), comprising:
- a cutting body (84) having at least one insert receiving pocket (86); and
- at least one cutting insert (20) in accordance with claim 1 removably secured in the insert receiving pocket (86).

22. The rotary cutting tool (82) according to claim 21, wherein:
- the tool axis (AT) defines a forward-rearward direction (DF, DR),
- each insert receiving pocket (86) opens out at a forward end surface (88) of the cutting body (84),
- each minor cutting edge (36) extends the entire length of its associated minor edge (32), and
- the entire operative minor cutting edge (36) of each cutting insert (20) is located axially forward of the forward end surface (88).

23. The rotary cutting tool (82) according to claim 21, wherein:
- the operative major cutting edge (34) of each cutting insert (20) forms a positive axial rake angle (δ1) with respect to the tool axis (AT).

24. The rotary cutting tool (82) according to claim 21, wherein:
- the insert receiving pocket (86) has:
  - a seat surface (92) facing in the direction of rotation (RT);
  - a radially outward facing first pocket wall (94) transverse to the seat surface (92); and
  - an axially forward facing second pocket wall (96) transverse to the seat surface (92);
- one of the two end surfaces (22a, 22b) is in contact with the seat surface (92);
- one of the two major side surfaces (26a, 26b) is in contact with the first pocket wall (94); and
- one of the two minor side surfaces (28a, 28b) is in contact with the second pocket wall (96).

25. The rotary cutting tool (82) according to claim 24, wherein:
- the seat surface (92) includes a threaded bore (98) extending along a bore axis (AB),
- an insert through bore (44) extending along a second insert axis (A2) intersects the insert's two major side surfaces (26a, 26b), and
- a clamping screw (100) passes through the insert through bore (44) and threadingly engages the threaded bore (98).

* * * * *